United States Patent [19]
Graber

[11] Patent Number: 5,341,845
[45] Date of Patent: Aug. 30, 1994

[54] CONTROL CARTRIDGE FOR A SINGLE-LEVER MIXER FITTING

[75] Inventor: Heinz Graber, Oberkulm, Switzerland

[73] Assignee: KWC AG, Unterkulm, Switzerland

[21] Appl. No.: 104,637

[22] Filed: Jul. 3, 1993

Related U.S. Application Data

[63] Continuation of Ser. No. 9,746, Jan. 27, 1993, abandoned.

[30] Foreign Application Priority Data

Feb. 25, 1992 [CH] Switzerland ............ 00572/92

[51] Int. Cl.$^5$ ............................................. F16K 11/00
[52] U.S. Cl. ............................ 137/625.41; 137/454.2
[58] Field of Search ............ 139/625.41, 625.4, 454.2

[56] References Cited

U.S. PATENT DOCUMENTS

| | | |
|---|---|---|
| 2,923,318 | 2/1960 | Monson . |
| 3,561,729 | 2/1971 | Politz . |
| 3,570,810 | 3/1971 | Kawolics . |
| 3,831,621 | 8/1974 | Anthony et al. . |
| 3,921,659 | 11/1975 | Rudewick, III . |
| 4,022,242 | 5/1977 | Turecek . |
| 4,058,289 | 11/1977 | Hicks . |
| 4,077,426 | 3/1978 | Karie . |
| 4,095,610 | 6/1978 | Priesmeyer . |
| 4,327,758 | 5/1982 | Uhlmann ............ 137/625.41 X |
| 4,501,408 | 2/1985 | Pawelzik et al. . |
| 4,678,002 | 7/1987 | Valley . |
| 4,823,841 | 4/1989 | Graber . |
| 4,915,352 | 4/1990 | Hochstrasser . |

FOREIGN PATENT DOCUMENTS

| | | |
|---|---|---|
| 0059697 | 9/1982 | European Pat. Off. . |
| 0103710 | 3/1984 | European Pat. Off. . |
| 0257135 | 3/1988 | European Pat. Off. . |
| 0311573 | 4/1989 | European Pat. Off. . |
| 0311762 | 4/1989 | European Pat. Off. . |
| 3127713 | 2/1983 | Fed. Rep. of Germany . |
| 3531217 | 12/1986 | Fed. Rep. of Germany . |
| 18333 | 5/1899 | Switzerland . |
| 649822A | 5/1985 | Switzerland . |
| 651119 | 8/1985 | Switzerland . |
| 654088A | 1/1986 | Switzerland . |
| 2073373 | 10/1981 | United Kingdom . |

OTHER PUBLICATIONS

"The Price Pfister Bodyguard", Price Pfister, brochure.

Primary Examiner—Arnold Rosenthal
Attorney, Agent, or Firm—Oliff & Berridge

[57] ABSTRACT

A control cartridge includes a hot and a cold water feed connection. An outlet connection allows cold, hot or mixed water to be tapped. Actuation of the control cartridge is performed, for example, by a lever which can be inserted into a bore of a rotatable control bell. Only a rotational movement is required for the associated mixer fitting to be opened by this lever and for the required water temperature to be set.

30 Claims, 3 Drawing Sheets

CONTROL CARTRIDGE FOR A SINGLE-LEVER MIXER FITTING

This is a continuation of application Ser. No. 08/009,746 filed Jan. 27, 1993, now abandoned.

BACKGROUND OF THE INVENTION

1. Field of the Invention

The present invention relates to a control cartridge for a single-lever mixer fitting having connections disposed in a housing for the supply of cold and hot water, and for the outlet of water.

2. Description of Related Art

On some mixer fittings, the through-flow water volume, hereinafter referred to simply as the water volume, and the mixing temperature between the temperatures of the cold and hot water can be set by means of a single lever.

A mixer fitting of this type, known from CH-A5 651 119, includes an actuating lever by which adjustments can be made to the water volume by a swivel movement and to the mixing temperature by a rotary movement. Upon opening, a first ceramic disk is linearly displaced relative to another ceramic disk and, for temperature adjustment, the first ceramic disk is twisted relative to the other disk. The two directly adjoining ceramic disks include apertures for cold and hot water and for the mixed discharge. When in the open position, the corresponding apertures of the two ceramic discs are flush with each other, and when in the closed position, they are blocked off by the other disk in each case. With this known mixer fitting, a temperature and volume limitation can be defined by the rotary adjustment of a stop.

In the known mixer fitting, the opening and setting of the mixing temperature by means of a single lever is very practical insofar as the lever is actuated manually. Where, however, the lever cannot or must not be grasped by hand, for example, for hygienic reasons, e.g., in a hospital, actuation by the arm or elbow is generally required. This calls however for increased dexterity, which, in particular in relation to rapid maneuvers, in an operating theater for example, cannot be presupposed, since movements in two degrees of freedom are necessary. It is also conceivable for handicapped people to have to actuate a mixer fitting of this kind without using any hands.

SUMMARY OF THE INVENTION

It is an object of the present invention to provide a control cartridge for a single-lever mixer fitting which, both for opening and closing and also for adjusting the mixing temperature, can be actuated using the arm or elbow without any increased dexterity.

In order to achieve the above and other objects, and to overcome the shortcomings set forth above, a control cartridge for a single-lever mixer fitting includes a housing having a first fixed control disk and a second rotatable control disk, which is rotatable solely about its center axis, wherein rotation of the second control disk about its center axis controls both the water temperature and the flow volume. The first disk includes a first inlet aperture and a second inlet aperture for respective communication with cold and hot water supplies, and an outlet aperture for communication with an outlet which leads, for example, to a faucet nozzle. The second disk includes an inlet aperture for communicating one or both of the inlet apertures in the first disk with a mixing chamber, and an outlet aperture for communicating the mixing chamber with the outlet aperture in the first disk. When the second disk is rotated in the opening direction from a closed position, the cold water inlet aperture is successively uncovered until cold water flow reaches a maximum, after which the hot water inlet aperture is also successively uncovered so that hot and cold water are mixed. As the second disk continues to be rotated in the opening direction, the outlet water temperature increases, and as the cold water inlet aperture is gradually covered so that the cold water supply is throttled to zero or near zero, the outlet water temperature reaches a maximum value.

Both for opening and closing (i.e., ON/OFF control) and for adjusting the mixing temperature, the control cartridge according to the present invention is moved in only one plane, since the movable control disk solely requires a rotary movement for all settings. This makes actuation considerably easier. It is particularly advantageous if the actuating lever is tailored to this type of actuation, in the configuration of its length for example.

BRIEF DESCRIPTION OF THE DRAWINGS

An illustrative embodiment of the invention is explained in greater detail with reference to the drawings in which like reference numerals refer to similar elements and wherein.

DETAILED DESCRIPTION OF PREFERRED EMBODIMENTS

Figure 1:
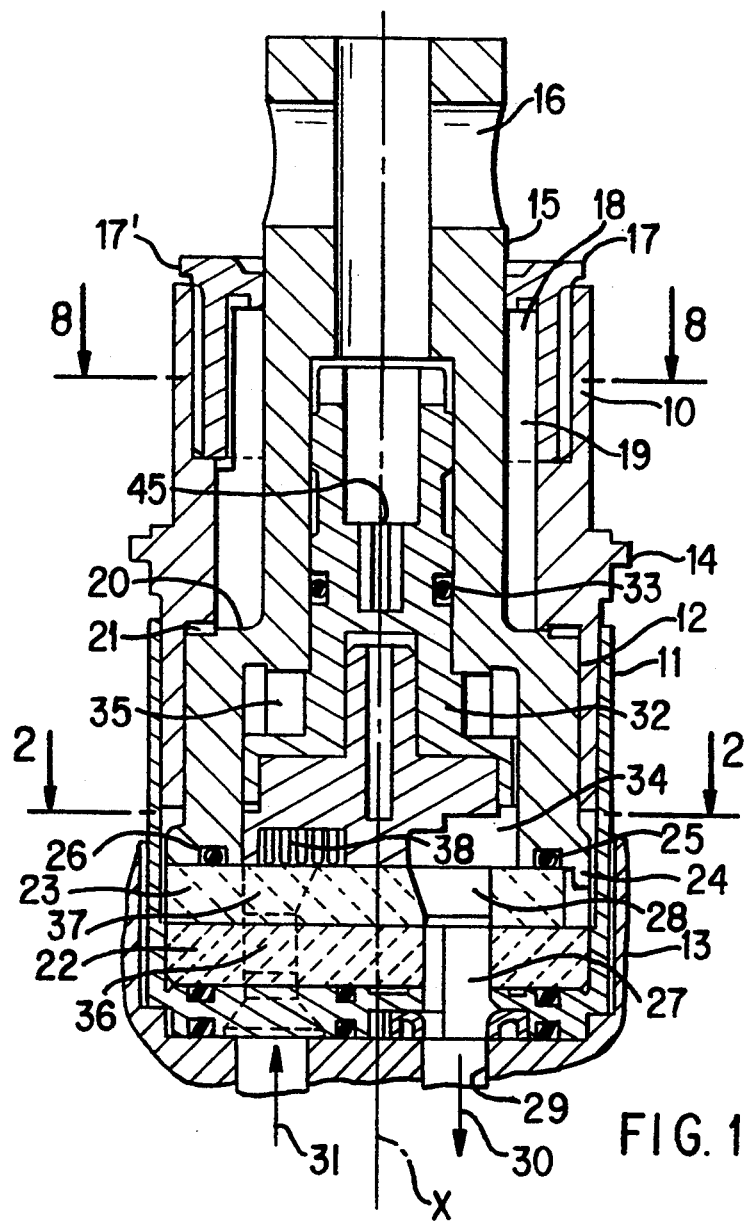
FIG. 1 shows a longitudinal section of a control cartridge for a single-lever mixer fitting in accordance with one embodiment of the present invention.

The control cartridge represented in FIG. 1 includes a housing comprising a top part 10 and a bottom part 11. The bottom part 11 overlaps the top part 10 and is connected to top part 10 by a catch connection 12. With the bottom part 11 to the fore, the control cartridge is inserted into a housing 13, indicated by the shaded areas, of a mixer fitting (not shown) and fastened into housing 13 by means of a union nut (not shown) to flange sections 14 disposed on the top part 10.

From the top part 10 of the housing there protrudes a control bell 15, which includes, transverse to its longitudinal extent, a bore 16 for receiving an actuating lever (not shown). The angle of rotation of the control bell 15 is limited by an adjustable temperature limit ring 17 inserted in the top part 10.

The control bell 15 includes stop cams 18, which interact with stops 19 disposed on the temperature limit ring 17. By a shoulder 20, the control bell 15 is supported by means of a slip ring 21 against an offset in the top part 10 of the housing.

A first, lower ceramic control disk 22 fixed to the housing, and a second, upper, rotatable ceramic control disk 23, hereinafter referred to simply as the first and second control disks, serve as shut-off and flow-volume adjusting elements for cold and hot water. Both control disks 22, 23 have a common fixed center axis, which coincides with the center axis x of the control cartridge.

In order to provide a rotary connection, the control bell 15 engages, by means of a dog 24, into a recess disposed in the second control disk 23. On the face of the control bell 15, there is disposed an annular groove 25 for receiving an 0-ring 26, which outwardly seals off the control bell 15 from the second control disk 23.

The control disks 22, 23 include apertures, of which only the outlet aperture 27 in the first control disk 22 and the outlet aperture 28 in the second control disk 23 are visible in FIG. 1. In the illustrated position, apertures 27, 28 lie flush with each other.

The aperture 27 opens out into and communicates with an outlet 29 on the housing side, which outlet conveys the cold or hot water or mixed water, depending on the respective position of the second control disk 23, in the direction of arrow 30. The supply of cold and hot water is provided by means of connections, likewise located on the housing side, which convey the cold and hot water in the direction of arrow 31.

A distributing element 32 is disposed within the control bell 15 and is sealed off from the control bell 15 by means of a second O-ring 33. Between the distributing element 32 and the second control disk 23, there is located an outlet chamber or mixing chamber 34. The distributing element 32 is supported in the axial direction, by means of supporting ribs 35, against an offset in the control bell 15.

In FIG. 1, inlet apertures 36, 37 are indicated by dashed lines in the control disks 22, 23, respectively. Above the inlet aperture 37, the distributing element 32 has spigot-like or bar-like projections 38, which extend towards the inlet aperture 37 and serve to reduce noise.

Figure 2:
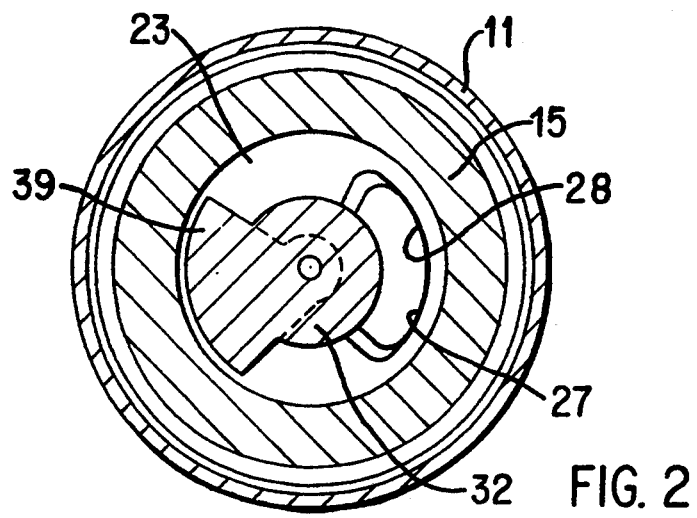
FIG. 2 shows a cross-section of the control cartridge along the line 2—2 in FIG. 1.

It can be seen from FIG. 2 that the distributing element 32 has a sector-like section 39 bearing the spigot-like or bar-like projections 38 according to FIG. 1. In addition, the shape of the outlet aperture 28 can be seen in the second control disk 23.

FIGS. 3 to 6 show top views onto the second control disk 23, disposed in the bottom part 11 of the housing, with the underlying first control disk 22. It should be noted that the first control disk 22 is shown rotated through 90° in the clockwise direction in relation to FIG. 2, so that the outlet aperture 27 illustrated on the right side in FIG. 1 is found at the bottom in FIGS. 3 to 6. From these figures, the position and shape of the apertures 28 and 37 in the second control disk 23 can be seen relative to each other. The inlet aperture 36 (already indicated in FIG. 1) in the first control disk 22 is the hot water inlet aperture. The second inlet aperture 40 in the first control disk 22 is the cold water inlet aperture.

Figure 3:
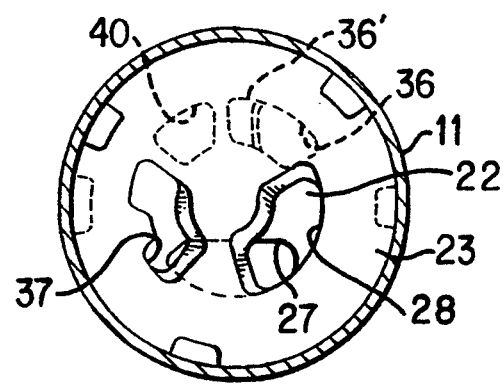
FIG. 3 is a view onto two control disks, lying one on top of the other, when in the closed position.

In the position of the second control disk 23 according to FIG. 3, both the cold water aperture 40 and the hot water aperture 36 in the first control disk 22 are closed off by the second disk 23, since the inlet apertures in the first control disk 22 do not coincide with any aperture in second control disk 23. Consequently, this position corresponds to the closed position or the OFF position.

Figure 4:
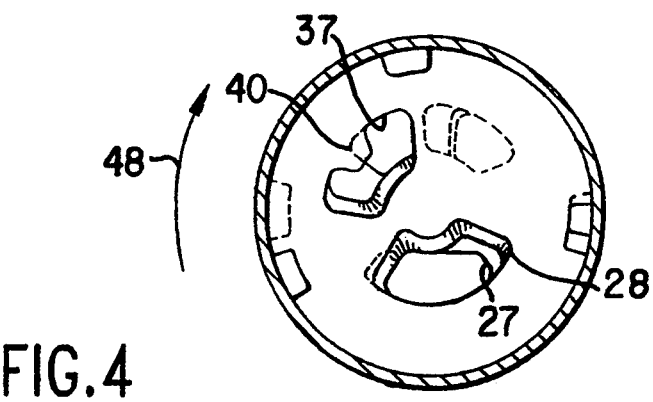
FIG. 4 is a view similar to FIG. 3, but in the cold position.

In the position of the second control disk 23 according to FIG. 4, the inlet apertures 37, 40, on the one hand, and the outlet apertures 27, 28, on the other hand, at least partially coincide. A connection is thus created from the cold water inlet aperture 40 to the outlet aperture 27, via the outlet or mixing chamber 34 illustrated in FIG. 1. This position corresponds to the cold position.

If the second control disk 23, in the arrangement illustrated in FIGS. 3 to 6, is rotated in the clockwise direction relative to the first control disk 22, as illustrated by arrow 48, this corresponds to the opening direction.

Figure 5:
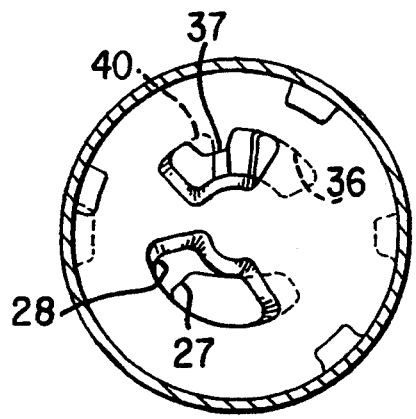
FIG. 5 is a view similar to FIG. 3, but in the middle or mixing position between the hot and cold positions.

In the position of the second control disk 23 according to FIG. 5, the inlet aperture 37 at least partially coincides both with the cold water inlet aperture 40 and with the hot water inlet aperture 36, and the outlet apertures 27, 28, at least partially coincide with each other. A connection is thus created between the cold water and hot water apertures 40, 36, via the outlet or mixing chamber 34 (FIG. 1), and the outlet aperture 27. This position corresponds to the mixing position.

Figure 6:
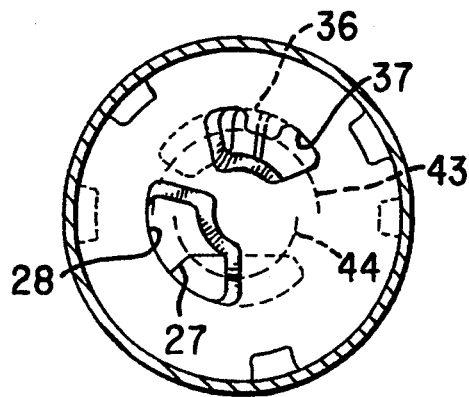
FIG. 6 is a view similar to FIG. 3, but in the hot position.

In the position of the second control disk 23 according to FIG. 6, the inlet apertures 36, 37 on the one hand, and the outlet apertures 27, 28 on the other hand, at least partially coincide. A connection is thus created from the hot water aperture 36, via the outlet or mixing chamber 34 (FIG. 1), to the outlet aperture 27. This position corresponds to the hot position.

The hot water inlet aperture 36 in the first control disk 22 includes a bevelling 36' (FIG. 3), so that its cross-section widens in the direction of flow 31 (FIG. 1).

It is evident from the positions shown in FIGS. 3 to 6 that when the second control disk 23 is rotated in the clockwise direction, i.e., in the opening direction 48, starting from the closed position according to FIG. 3, the cold water aperture is first gradually freed up (i.e., uncovered) until the full water-flow volume is achieved according to FIG. 4. Upon further rotation in the clockwise direction 48, the hot water-flow volume is additionally constantly freed, and cold and hot water are thus mixed according to FIG. 5. Upon yet further rotation in the clockwise direction, the cold water-flow volume is gradually throttled, so that the temperature of the outflowing water further increases until, according to FIG. 6, only the hot water aperture remains opened (i.e., uncovered).

The aperture openings are dimensioned so that the total water-flow volume remains constant after the cold water supply has been fully opened.

It is possible however that the temperature of the delivered hot water will be too hot to use. In this event, the angle of rotation of the second control disk 23 can be limited in the clockwise direction. This is accomplished, for example, by the arrangement represented in FIGS. 1, 7 and 8, having the temperature limit ring 17, the operation of which is described in greater detail below.

Figure 8:
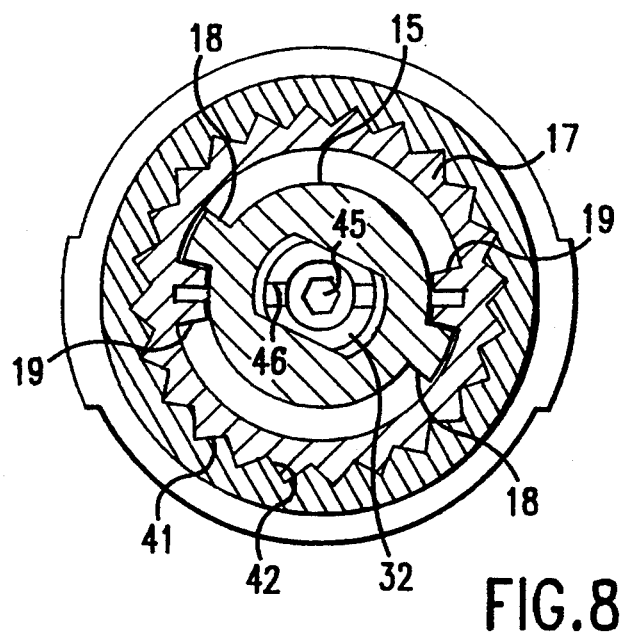
FIG. 8 is a cross-section through the control cartridge of FIG. 1 along line 8—8, and illustrates a temperature limit ring.

FIG. 8 shows in cross-section along line 8—8 of FIG. 1, the temperature limit ring 17, which includes an outer toothing 41. The temperature limit ring can be pulled out (upwardly in FIG. 1) by its edge 17' which protrudes out of the housing top part 10 (FIG. 1) and, according to the toothing 41, re-inserted step by step, rotationally offset, into an inner toothing 42 disposed in the top part 10.

The temperature limit ring 17 limits, by means of its stops 19, the angle of rotation of the control bell 15, which control bell includes the stop cams 18 for interacting with the stops 19. As a result of the limitation of the angle of rotation, not only is the maximum opening of the hot water inlet aperture 36 limited, but also the cold water aperture 40 is not fully closed when second disk 23 is rotated to the maximum clockwise (open) position. This results in a limitation of the temperature of the outflowing mixed water.

Figure 7:
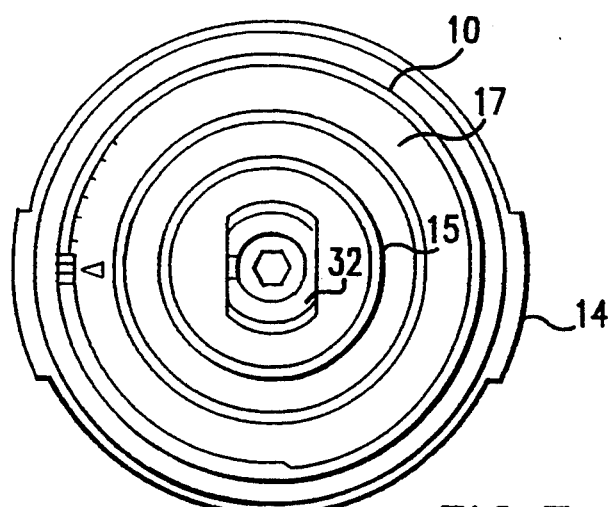
FIG. 7 is a top view of the control cartridge.

In the position of the temperature limit ring 17 according to FIGS. 7 and 8, housing-fixed stops (not visible in these figures) are located exactly below the stops 19 of the temperature limit ring 17. These housing-fixed stops limit the angle of rotation in the closing direction to define the closed position.

From the above description, it is evident that the second control disk 23 is disposed rotatably, according to the present invention, solely about the center axis x and that both the corresponding inlet apertures 40, 36; 37 of the two control disks 22; 23, on the one hand, and their corresponding outlet apertures 27; 28, on the other hand, are respectively disposed on a common circular line 43 or 44 according to FIG. 6 and are distributed such that, when the second control disk 23 is rotated in the opening direction 48, successively the cold water supply is freed up to the maximum water-flow volume, after which the hot water supply is additionally freed and the cold water supply is then throttled down to the limit set at the temperature limit ring 17 or to zero.

Figure 9:
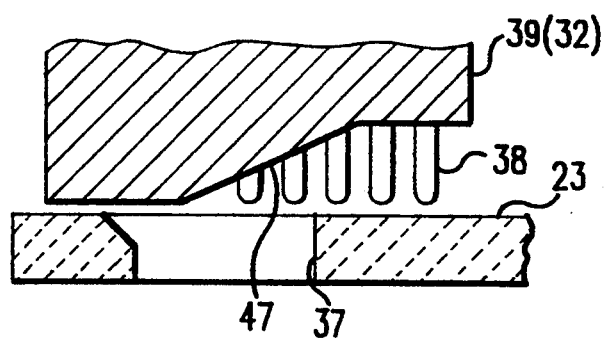
FIG. 9 is an enlarged detailed view of a portion of FIG. 1, illustrating an arrangement for noise reduction and through-flow limitation.

FIG. 9 shows on an enlarged scale the spigot-like or bar-like projections 38 located on the sector-like section 39 of the distributing element 32, which have already been described in relation to FIG. 1 and which serve to reduce noise.

It can further be seen from FIG. 9 how the inlet aperture 37 in the second control disk 23 is partially covered by a profiling 47 on the sector-like section 39 of the distributing element 32 in dependence on the relative position between the distributing element 32 and the second control disk 23. The maximum through-flow can thereby be adjustably limited.

In order to allow the maximum through-flow to be set, the distributing element 32 includes in its center, according to FIG. 8, a hexagonal socket 45 and a slot 46. Distributing element 32 can thereby be rotated relative to the control bell 15 and thus relative to the second control disk 23 by means of, e.g., an Allan key or a screwdriver. In this case, the second O-ring 33 (FIG. 1) serves additionally as an anti-rotation securement in order to retain the set position of the distributing element 32 within the control bell 15. This is sufficient, since no foreign torque is exerted upon the distributing element 32.

The inlet aperture 37 in the second control disk 23 is disposed offset by less than 180°, relative to the outlet aperture 28, in the opening direction 48. Preferably, the angle between the outlet aperture 28 and the inlet aperture 37, measures at least approximately 145°.

In the first control disk 22, the average angle between the apertures 40, 36 for the cold and hot water supplies preferably measures around 70°.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A control cartridge for a single-lever mixer fitting having a cold water connection, a hot water connection and an outlet connection disposed in a housing comprising: a first control disk fixed to the housing, a second control disk movably disposed in the housing relative to the first control disk, and an actuating element attached to the second control disk, said first control disk having a first inlet aperture for communicating with the cold water connection, a second inlet aperture for communicating with the hot water connection, and an outlet aperture for communicating with the outlet connection, the second control disk having an inlet aperture and an outlet aperture, said second control disk disposed in the housing so as to be rotatable solely about a center axis, both the first and second inlet apertures of the first control disk and the inlet aperture of the second control disk disposed on a first common circular line, the outlet apertures of the first and second control disks disposed on a second common circular line and distributed on said first and second disks so that when the second control disk is rotated in an opening direction from a closed position, successively one of the first and second inlet apertures in the first disk is uncovered due to movement of the inlet aperture in the second disk until water flow through said one inlet aperture is freed up to a maximum water-flow volume, after which the other of the first and second inlet apertures in the first disk is additionally uncovered, and then said one of the first and second inlet apertures in the first disk is covered by the second disk until water flow through said one inlet aperture is throttled down to approximately zero water-flow volume.

2. The control cartridge as claimed in claim 1, wherein the first and second inlet apertures in the first control disk are located next to each other and at least approximately symmetrically to a line intersecting the center axis, opposite the first disk outlet aperture, and wherein the inlet aperture of the second control disk is disposed offset by less than 180° relative to the second control disk outlet aperture in the opening direction.

3. The control cartridge as claimed in claim 2, wherein the angle between the outlet aperture and the inlet aperture of the second control disk is at least approximately 145°.

4. The control cartridge as claimed in claim 2, wherein the average angle between the first and second inlet apertures in the first control disk is about 70°.

5. The control cartridge as claimed in claim 1, wherein the second inlet aperture in the first control disk includes a tapered sidewall, so that the cross-section of the second inlet aperture widens in the direction of water flow therethrough.

6. The control cartridge as claimed in claim 1, wherein the inlet aperture in the second control disk is profiled and is arranged relative to the first and second inlet apertures in the first control disk so that the water-flow volume of the mixed water passing through the second disk inlet aperture from the first and second inlet apertures of the first control disk remains constant once the maximum water-flow volume through the first inlet aperture in the first control disk has been reached.

7. The control cartridge as claimed in claim 1, further comprising at least one adjustable stop mounted on the housing for limiting an angle of rotation of the second control disk.

8. The control cartridge as claimed in claim 7, wherein the at least one stop is provided on a temperature limit ring having an outer toothing, which can be brought step by step into engagement with an inner toothing provided on the housing.

9. The control cartridge as claimed in claim 1, further comprising a distributing element located directly adjacent to the second control disk, said distributing element together with the second control disk defining a mixing chamber between the inlet and outlet apertures of the second control disk.

10. The control cartridge as claimed in claim 9, wherein the distributing element includes a section having projections in an area located adjacent to the inlet aperture of the second control disk, said projections extending towards the second control disk inlet aperture.

11. The control cartridge as claimed in claim 10, wherein a portion of the section of the distributing element lying opposite the inlet aperture in the second control disk has a tapered profile in order to limit adjustably said maximum water-flow volume in dependence on the relative position between the distributing element and the second control disk.

12. The control cartridge as claimed in claim 11, further comprising adjusting means for adjusting the relative position between said distributing element and said second control disk.

13. The control cartridge as claimed in claim 1, wherein said first and second control disks are ceramic disks.

14. The control cartridge as claimed in claim 1, wherein said first and second inlet apertures are arranged on said first control disk relative to the inlet aperture on said second control disk so that rotation of said second control disk from said closed position causes the first inlet aperture of said first disk to be uncovered initially, then both said first and second inlet apertures in the first control disk to be uncovered, and then said first inlet aperture to become at least mostly covered while maintaining said second inlet aperture at least partially uncovered.

15. A control cartridge for selectively communicating hot and cold water supplies with a water outlet, comprising:
a first control disk having opposite surfaces and a first inlet aperture extending between said surfaces for communication with a cold water supply, a second inlet aperture extending between said surfaces for communication with a hot water supply, and an outlet aperture extending between said surfaces for communication with a water outlet;
a second control disk having opposite surfaces and located relative to said first control disk so that one of the surfaces of the first control disk contacts one of the surfaces of the second control disk, said second control disk being rotatable relative to said first control disk and having an inlet aperture extending between said surfaces for selective communication with the first and second inlet apertures of the first control disk, and an outlet aperture extending between said surfaces for selective communication with the outlet aperture of said first control disk;
a mixing chamber between said inlet and outlet apertures of said second control disk; and
an actuating element attached to the second control disk for rotating said second control disk;
wherein only rotation of said second control disk causes said second control disk inlet aperture to be selectively communicated with at least one of the first and second inlet apertures of the first control disk, and said second control disk outlet aperture to be selectively communicated with the outlet aperture of said first control disk so that temperature and water-flow volume of water reaching said water outlet is controlled solely by rotation of said second control disk in a single plane.

16. The control cartridge as claimed in claim 15, wherein said first control disk, said second control disk and said actuating element have a common central axis.

17. The control cartridge as claimed in claim 16, wherein said actuating element includes an elongated control bell having said common axis as a longitudinal axis and a bore extending through said control bell perpendicular to said longitudinal axis for receiving a lever.

18. The control cartridge as claimed in claim 17, further comprising a housing, said first control disk, said second control disk and said actuating element located in said housing, said housing having a cold water inlet connection, a hot water inlet connection and an outlet connection for communicating said first and second inlet apertures and said outlet aperture in the first control disk with the hot and cold water supplies and the water outlet, respectively.

19. The control cartridge as claimed in claim 16, wherein the first and second inlet apertures in the first control disk are located next to each other and at least approximately symmetrically to a line intersecting the center axis, opposite the first disk outlet aperture, and wherein, the inlet aperture of the second control disk is disposed offset by less than 180° relative to the second control disk outlet aperture.

20. The control cartridge as claimed in claim 15, wherein the second inlet aperture in the first control disk includes a tapered sidewall, so that the cross section of the second inlet aperture widens in the direction of water flow therethrough.

21. The control cartridge as claimed in claim 15, wherein the inlet aperture in the second control disk is profiled and is arranged relative to the first and second inlet apertures in the first control disk so that a water-flow volume of the mixed water passing through the second disk inlet aperture from the first and second inlet apertures of the first control disk remains constant, once a maximum water-flow volume through the first inlet aperture in the first control disk has been reached.

22. The control cartridge as claimed in claim 18, further comprising at least one adjustable stop mounted on the housing for limiting an angle of rotation of the second control disk.

23. The control cartridge as claimed in claim 15, further comprising a distributing element located directly adjacent to the second control disk, said distributing element, together with the second control disk, defining said mixing chamber between the inlet and outlet apertures of the second control disk.

24. The control cartridge as claimed in claim 23, wherein the distributing element includes a section having projections in an area located adjacent to the inlet aperture of the second control disk, said projections extending towards the inlet aperture.

25. The control cartridge as claimed in claim 24, wherein a portion of the section of the distributing element lying opposite the inlet aperture in the second control disk has a tapered profile in order to limit adjustably a maximum water-flow volume in dependence on the relative position between the distributing element and the second control disk.

26. The control cartridge as claimed in claim 25, further comprising adjusting means for adjusting the relative position between said distributing element and said second control disk.

27. The control cartridge as claimed in claim 1, wherein said inlet apertures of said second control disk is arcuate shaped, having radially inner and outer edges, wherein one of said inner and outer edges includes a projection.

28. The control cartridge as claimed in claim 1, wherein said inlet aperture of said second control disk is shaped so that when said second control disk is rotated at a constant speed relative to said first control disk, to cause said inlet aperture of said second control disk to begin overlapping with the first inlet aperture of the first control disk, the amount of said overlap initially increases until a maximum overlap is reached, then as said inlet aperture of the second control disk begins to overlap with the second inlet aperture of the first control disk, a rate at which said second control disk inlet aperture overlaps with said second inlet aperture relative to said overlap with said first inlet aperture changes gradually.

29. The control cartridge as claimed in claim 15, wherein said inlet aperture of said second control disk is arcuate shaped, having radially inner and outer edges, wherein one of said inner and outer edges includes a projection.

30. The control cartridge as claimed in claim 15, wherein said inlet aperture of said second control disk is shaped so that when said second control disk is rotated at a constant speed relative to said first control disk, to cause said inlet aperture of said second control disk to begin overlapping with the first inlet aperture of the first control disk, the amount of said overlap initially increases until a maximum overlap is reached, then as said inlet aperture of the second control disk begins to overlap with the second inlet aperture of the first control disk, a rate at which said second control disk inlet aperture overlaps with said second inlet aperture relative to said overlap with said first inlet aperture changes gradually.

* * * * *